United States Patent [19]

Burwell et al.

[11] Patent Number: 5,129,315

[45] Date of Patent: Jul. 14, 1992

[54] APPARATUS FOR FORMING AN ARRAY OF EXTRUDED FILAMENTS

[75] Inventors: Malcolm C. Burwell, Cambridgeshire; Pauline E. Murphy, York; David I. Neill, Norfolk, all of England; Peter J. Sayer, Gwynedd, Wales

[73] Assignee: Nestec S.A., Vevey, Switzerland

[21] Appl. No.: 545,284

[22] Filed: Jun. 27, 1990

Related U.S. Application Data

[62] Division of Ser. No. 252,802, Oct. 3, 1988.

[30] Foreign Application Priority Data

| Oct. 2, 1987 | [GB] | United Kingdom | 8723201 |
| Oct. 2, 1987 | [GB] | United Kingdom | 8723202 |

[51] Int. Cl.$^5$ ............................................. A23P 1/00
[52] U.S. Cl. ................................ 99/450.1; 99/450.1; 99/494; 425/6; 425/131.1
[58] Field of Search .............. 99/494, 450.1, 450.2, 99/450.6, 450.7, 353–355; 425/131.1, 131.5, 133.1, 376 R; 426/89, 94, 503, 620

[56] References Cited

U.S. PATENT DOCUMENTS

| 2,979,764 | 4/1961 | Andrew | 425/6 |
| 4,004,035 | 1/1977 | Hirzel et al. | 99/450.2 |
| 4,275,647 | 6/1981 | Chambers et al. | 426/284 |
| 4,279,579 | 6/1981 | Froeschke | 425/6 |
| 4,559,000 | 12/1985 | Froeschke | 425/6 |
| 4,563,358 | 1/1986 | Mercer et al. | 426/89 |
| 4,859,165 | 8/1989 | Hoashi | 425/133.1 |
| 4,878,425 | 11/1989 | Butcher et al. | 99/450.2 |
| 4,900,572 | 2/1990 | Repholz et al. | 99/450.7 |

Primary Examiner—Timothy F. Simone
Attorney, Agent, or Firm—Vogt & O'Donnell

[57] ABSTRACT

An apparatus for forming an array of extruded filaments combines an extrusion head having an opening, a movable body having an array of a plurality of apertures aligned with the opening for forming an array of filaments of material extruded through the opening and the apertures, and a support positioned for receiving the extruded array of filaments. The apertured body is moved continuously beneath the extrusion head opening so that a plurality of apertures are positioned simultaneously underneath the opening and in contact with the extruded material and an array of filaments is continuously formed. Relative motion of the support with respect to arrays of filaments forms a lattice structure of superimposed arrays.

11 Claims, 4 Drawing Sheets

APPARATUS FOR FORMING AN ARRAY OF EXTRUDED FILAMENTS

CROSS REFERENCE TO RELATED APPLICATION

This is a divisional application of application Ser. No. 07/252,802, filed Oct. 3, 1988.

FIELD OF THE INVENTION

This invention relates to edible products, and especially to confectionery products, e.g of chocolate, and to apparatus and processes for their preparation.

INFORMATION DISCLOSURE

A well-known edible product is the cereal biscuit sold in the United Kingdom at least under the trade name "Shredded Wheat". A process for producing such biscuits comprises passing boiled wheat between two rollers, one smooth and one grooved, to produce long shreds which are overlaid to form a continuous biscuit which is cut into individual sizes (by crimping) and baked The product is frangible, and comprises parallel discrete strands of wheat, orthogonal to the longitudinal axis of an individual biscuit. The ends of an individual biscuit may be open but the sides are essentially closed.

Confectionery products having a textured surface are also well known. The texture is provided on a continuous surface of the edible product by moulding or otherwise texturing the surface of the product, or by applying to the product a pre-formed pattern. For example, a single strand of chocolate may be produced by strickling on to a release paper; the pattern may include overlapping. The pre-formed decoration (in which the chocolate at intersections will have merged) is then applied on to the surface of the item of confectionery Various types of apparatus are known, in which strands are formed by extrusion through an aperture moving relative to an extrusion head. For example, CH-A-0646342 discloses extruding parallel strands of dry material, e.g. foodstuffs and chemicals, on to a moving belt, in the direction of travel of the belt.

GB-A-1604585 and GB-A-1604586 disclose a food product which comprises a net having mesh strands and net intersections which are integrally formed of an edible material. The net is formed as a one-step operation by extrusion; a filling of another edible material may be provided simultaneously. A cereal-based product of this type has been available in the United Kingdom at least under the trade name "Criss-Cross". The one-step extrusion process is directly based on previously-known plastics technology.

GB-A-2186386 discloses the one-step production of an edible structure having a continuous exterior and axially continuous internal "struts", e.g. in a Y-shape, which are continuous with the surface. The longitudinal passages are void or can be filled, e.g. with a cream. Further relative rotation between coaxial extrusion dies produces external ribs in a helical configuration, continuous with the structure. The product has bite characteristics determined by the relatively hard exterior and, when that is broken, the structurally-continuous but relatively weak struts and any filling. Such a product is available in the United Kingdom at least under the trade name "Spira".

Another well-known chocolate product, sold under in the United Kingdom at least under the trade name "Cadbury's Flake", also has different consistencies at the surface and the centre. However, it is soft then hard when bitten. The product comprises an essentially solid tube of chocolate and, externally, longitudinally-extending shreds of chocolate.

U.S. Pat. No. 4,559,000 discloses apparatus in which a flowable viscous mass passes, under gravity, through a slit and then through apertures in a band moving past the slit, and on to a conveyor which travels below the band and in the same direction and at the same speed. The length of the slit is at right angles to the direction of travel of the band and the conveyor. As rows of apertures in the band pass beneath the slit, drops of the viscous material fall on to the conveyor.

U.S. Pat. No. 2,648,297 discloses a method of making a confectionery product, in which a viscous mass of boiled, ready-to-congeal, threadable candy syrup falls through apertures in a pan as individual solid strings, the strings reduce in diameter by gravity draw, and the resultant threads congeal separately and fall on to a conveyor where the threads are superimposed The product is a continuous laminated layer of candy stock Separate strips of a width of the desired candy bar may be built up by suitably spacing the holes in the pan. A filling can be introduced.

U.S. Pat. No. 3,776,185 discloses apparatus comprising an axially-horizontal drum having a number of apertures and moving at a tangential speed equal to that of a conveyor carrying confectionery pieces. A cream feeder in the drum forces cream through the apertures which are in register with the confectionery pieces.

SUMMARY OF THE INVENTION

An edible product according to the present invention comprises, externally, a self-supporting, frangible, open lattice (i.e. non-continuous) structure of discrete filaments and, internally, a void or a filling of a consistency different from that of the external structure. The product has novel bite characteristics, especially in the confectionery field and especially when including a filling, usually of a consistency softer and less chewy than the external structure. Preferably, the lattice is defined by filaments spanning an angle of no more than 15° or 20°, and generally in the "plane of bite", which contributes to the product's desirable bite characteristics.

An essentially tubular product of the present invention may be prepared by a process which comprises superimposing two or more arrays of essentially parallel filaments on a support, to give one half (or "shell", as the half-tube will be described below) of the external structure; (if desired) introducing filling into one or each of two of the shells; and bringing and bonding the two shells together. The three sequential steps will be described herein as "deposition", "filling" and "collating".

Novel apparatus for use in the deposition step of the given process comprises a reservoir for the edible material, a continuous band or other thin body which comprises a line or other array of apertures, e.g. in the direction of the band, and means for passing the body continuously beneath the reservoir such that a plurality of apertures in the line can be simultaneously in contact with the material.

The present invention provides an apparatus for forming an array of filaments comprising an extrusion head having an opening for extruding a material; a body having an array of a plurality of apertures aligned with the opening for forming an array of filaments of material extruded through the opening and the apertures; means for moving the apertured body continuously beneath the extrusion head opening such that, in operation, a plurality of apertures are simultaneously positioned underneath the extrusion head opening and in contact with the extruded material and an array of filaments is continuously formed; and a support for receiving the formed array of extruded filaments. Means for providing relative motion of the support with respect to the apertured body may be provided, as may means for changing the relative directions of movement of the support and the apertured body such that, in operation, a lattice of superimposed arrays of filaments is deposited on the support.

DETAILED DESCRIPTION OF THE INVENTION

The invention will be illustrated by way of example only with reference to the accompanying drawings.

DETAILED DESCRIPTION OF THE DRAWINGS

Figure 1:
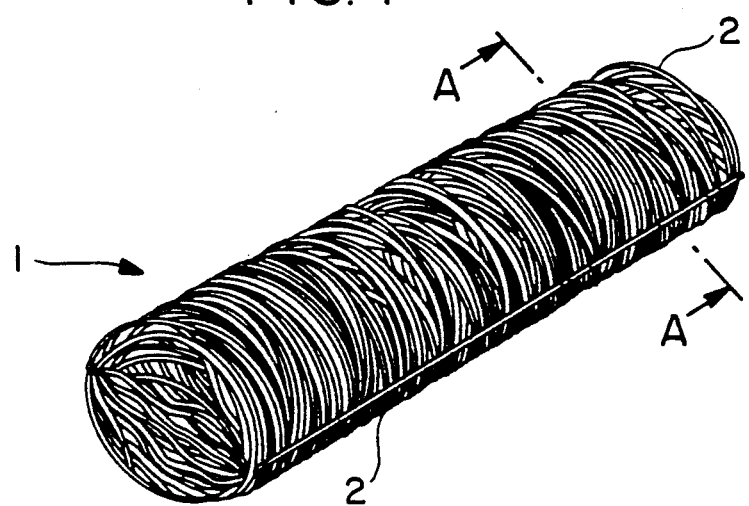
FIG. 1 is a perspective view of a product of the invention.

FIG. 1 shows a countline product 1 comprising a tubular lattice of filaments 2. The product 1 may be filled or unfilled, although the presence of a filling may not be readily apparent from such an external view. The product has a novel, distinctive appearance.

As has been indicated above, the external structure of a product of the invention may be prepared by forming shells which are bonded together. A shell 3 including a filling 4 is shown in FIG. 2, supported in a corresponding trough in a mould 5.

If the material is of a suitable nature, the filaments can be extruded on to a support moving relative to the source of the filaments. It is particularly preferred that the filaments should be of chocolate, and a convenient procedure for their production is by the extrusion of tempered, supercooled chocolate filaments, essentially by strickling, such that the filaments in the external structure of the product are of crystalline chocolate. Supercooled chocolate extruded through fine nozzles (e.g. 1 to 3 mm in diameter) gives chocolate filaments which tend to remain discrete as they solidify, rather than flowing into an amorphous mass. Supercooling is achieved, for example, by a reduction in temperature of tempered chocolate from 31° to 24° C., taking into account the removal of energy of crystallisation.

Figure 2:
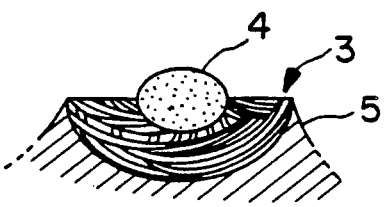
FIG. 2 is a cross-section through a shell-type mould supporting a (filled) shell corresponding to one half of the product, along the line A—A, shown in FIG. 1.

A filament of supercooled chocolate deposited across the sides of a mould such as that shown in FIG. 2 will conform, under the influence of gravity, to the shape of the mould. The consistency of the material may be such that the mould does not actually need a bottom; thus the support may comprise essentially only sides, e.g. parallel wires or bars, defining the width of the external structure. That width is, for example, 10 to 40 mm; a filament deposited on to a mould 15 mm wide might bend under its own weight, e.g. to a curvature defined by a mould, to a length of 20 mm.

The filaments may be of a cooked or cookable pasta or potato composition, or of a chocolate composition (whether supercoolable or having a relatively high solids content). The product is generally distinguished from "Shredded Wheat" biscuits owing to its open lattice structure and also, in preferred embodiments of the invention, to the spacing between filaments (e.g. 1 to 3 mm), the thickness of the filaments (e.g. 1 to 3 mm), the thickness of the external structure (e.g. 3 to 20 mm) and/or the presence of a filling.

A product of the invention preferably comprises two or more, e.g. at least four, superimposed pairs of arrays of essentially parallel filaments. The filaments in each alternate superimposed array will often be parallel. The angle between superimposed arrays of parallel filaments determines the bite characteristics and also the external appearance of the product. The angle may be as much as 90°, giving a very "open" lattice, although it is generally preferred that the lattice should be less open than that. The angle is preferably less than 30°, preferably 5° to 20°, e.g. 10°.

The openness of the lattice is not inconsistent with a self-supporting structure, but is at least partially responsible for the desirable characteristics of the product. The geometry of the lattice, the size and spacing of the filaments, and the cooking of certain edible materials or the cooling of chocolate having sufficient flowability that there is some coalescence between contiguous filaments which are nevertheless essentially discrete, can provide self-support. If necessary, an edible bonding agent could be used.

The openness of the lattice will usually be such that the interior of the structure or the filling is open to the atmosphere surrounding the exterior of the product. In theory, this limits fillings to those which are unaffected by contact with the atmosphere; in practice, products of the invention will be marketed in the form of bars having individual air-tight wrappers This is conventional in the industry.

If a filling is used, it should be of a consistency which does not flow through the lattice. The filling is, for example, solid chocolate, but preferably contrasts with both the consistency/texture and the taste of the external structure of the product. A light montelimar (or "mont") is suitable.

A product of the invention, having unique properties, can be simply manufactured from known materials. Apparatus for its production will now be described.

Figure 3:
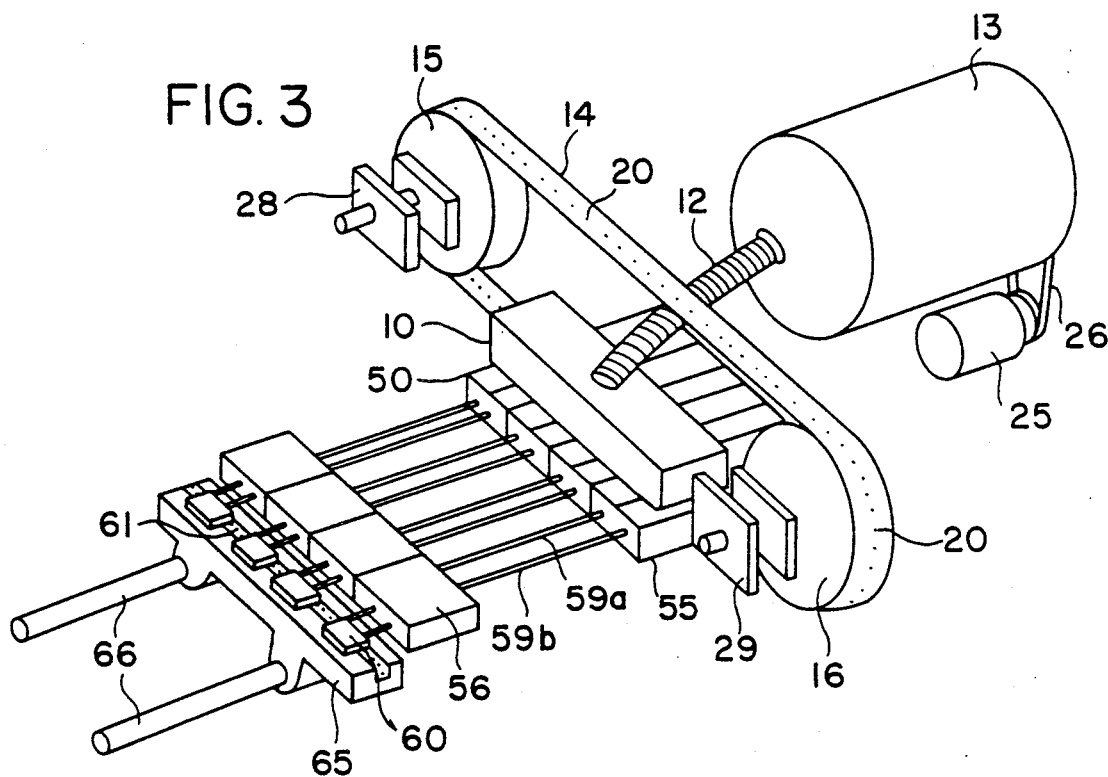
FIG. 3 is an overall view of apparatus of and for deposition in accordance with the invention.

FIG. 3 shows a chocolate depositor head 10 supplied via a pipe 12 from a supply 13. A continuous band 14, e.g. of steel, is driven by means (not shown) driving one or both of rolls 15 and 16. The supply 13 is in the form of a scraped surface heat exchanger agitated by means of a motor 25 via a belt 26. The band 14 is maintained in tension by means of tensioning units 28,29 on which the rolls 15,16 are mounted.

Figure 4:
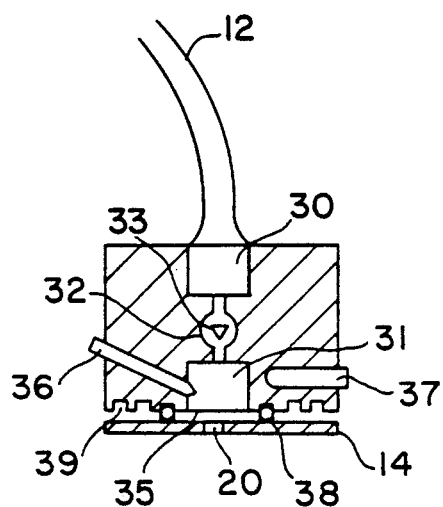
FIG. 4 is a cross-section through the depositor head shown in FIG. 3, with a band in contact therewith, in a plane orthogonal to the direction of travel of its band.
Figure 5:
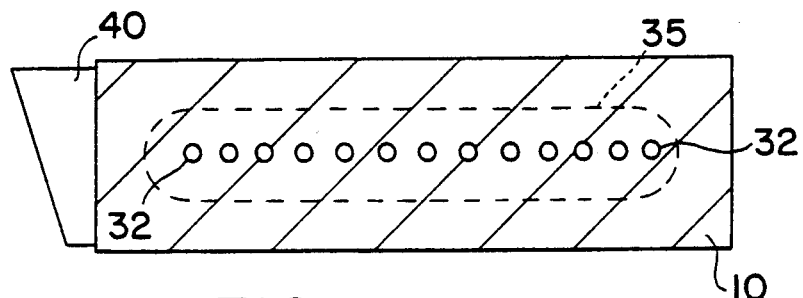
FIG. 5 is a cross-section through the same head, parallel to the width of the band, and showing a path of relative reciprocation of a support.

The deposition device is shown in more detail in FIGS. 4 and 5. The depositor head 10 comprises an upper plenum chamber 30 and a lower plenum chamber 31. The plenum chambers are connected by a plurality of channels 32, in each of which is seated an essentially conical member 33 whose position can be mechanically adjusted in order to control the flow of extrudable material from the upper plenum chamber 30 to the lower plenum chamber 31. The longitudinal band 14 runs in contact with a longitudinal slit 35 in the underside of the depositor head 10, aligned in the same longitudinal plane, thereby providing apertures through which material in the head 10 is extruded downwardly under gravity and usually also under applied pressure.

The flow of chocolate or other extrudable material in the head is adjusted so that the pressure of the material on the band 14 is essentially uniform along the length of the slit 35. The flow adjusters 33 are controlled by servo motors or other means (not shown) in order to provide this, by compensating for any gradient of distribution away from the input point of the supply pipe 12 to the ends of the upper plenum chamber 30, and also for build-up of material at one end of the lower plenum chamber 31 as the result of drag by movement of the band 14.

Further control of the conditions in the depositor head is provided by water-cooling in a finger 36 and a pressure regulator or temperature probe 37. Two or three or more of each of the control members 36,37 may be provided along the length of the head 10. Temperatures can be controlled to ±0.5° C., and perhaps to different levels at different points along the head.

In order to avoid undesirable spillage of the extrudible material during use, longitudinally-extending lip seals 38 are provided on either side of the slit 35. However, it is also desirable to ensure that there is no excessive build-up of pressure within the head, and some leakage of the extrudible material can be allowed for. There will usually be some small degree of tolerance between the band and the head. In order to avoid chocolate undergoing undesirable changes in composition if forced out by capillarity, having escaped the lip seals 38, the head 10 includes four longitudinally-extending relief chambers 39. A scraper 40 ensures that the band is effectively cleaned before its continuing reuse as "nozzles" for extrusion. Again, in order to relieve capillary action, the scraper can have relief chambers or notches included in its scraping surface.

Figure 6:
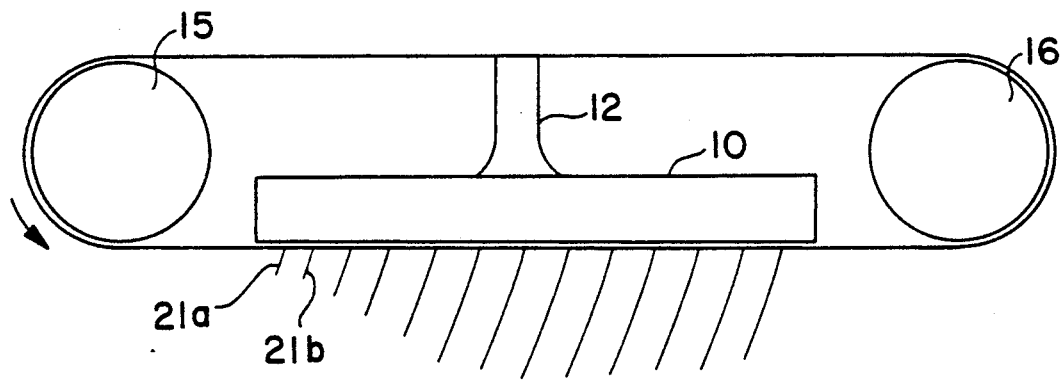
FIG. 6 is a side view of the head, showing extruded filaments.

FIG. 6 illustrates the fact that, in use, filaments 21a, 21b, etc. of extrudable material pass through the apertures 20 by the action of the pressure on the supply and thence under gravity. Depending on the distance between the band 14 and the support on to which the filaments are to be deposited, the filaments when first formed, e.g. filament 21a, will not descend as far as the support. In practice, depending on the size of the apertures 20 and the velocity with which the apertures 20 pass in contact with the extrudable material, the filaments when initially formed may merge to give a curtain of material; in any case, the support on which the filaments are to be deposited should extend only across the width of the linear array of filaments which descends as far as the support.

Returning now to FIG. 3, filaments from the head 10 are deposited on to moulds 50 on support members 55. Each mould 50 comprises (two) rows of troughs which define half-structures of the invention.

Each support 55 and also a pallet 56 are mounted on a pair of rods 59a,59b themselves mounted, on the opposite side of the support 55 from the pallet 56, on a cam follower 60. The cam follower 60 lies in a cam track 61 in a cross-head 65 which can be moved on cross-beams 66. The cross-head 65 accommodates four sets each of cam follower, rods, pallet and support at any one time.

The cross-head 65 is driven by a cross-head motor (not seen) between the position illustrated in FIG. 3 and the position in which the cross-head 65 is at the end of the beams 66. Reciprocation between these positions causes four moulds 50 to reciprocate beneath the head 10. Filaments of, say, chocolate are therefore deposited across the moulds, at an angle to the axis of the moulds; the "helix" angle is determined by the relative velocities of the band, the conveyor and the head, i.e. the rate of reciprocation. Reciprocation causes superimposition of linear arrays of filaments across the moulds and in particular across the troughs. The end troughs receive the material which is deposited as the cross-head 65 changes velocity; no product of the invention is formed in these end troughs, but the material which is deposited can be recovered and reused.

After a predetermined number of reciprocations, one or all of the filled moulds are displaced from the cross-head 65. The filled moulds are then passed under a cooling head (if cooling is considered necessary).

The following parameters are given by way of example only. Each mould passes the head 10-20 times. The belt has apertures 1.7 mm in diameter whose centres are spaced uniformly by 6 mm. The length of the band in contact with the material to be deposited is 1200 mm, so that 200 filaments are formed at any one time. The helix angle of filament deposition, defining the "lattice" in the product, is about 7° (corresponding to an angle of about 14° between the two orientations of filaments).

Within the depositor head, the band has a lateral tolerance of, say, 6 mm and a vertical tolerance of 0.5 mm. These values have been associated with a band 0.6 mm thick and 200 mm wide.

Where the filaments are first formed, the band is 50-100 mm above the moulds. Over this drop, the 1.7 mm "nozzles" give deposited filaments about 2 mm in diameter. Each trough, in which a shell constituting half a product of the invention is formed, is about 100 mm long and about 30 mm wide. These dimensions determine the dimensions of the ultimate product. A product as shown in FIG. 1 is, for example, 31 mm wide (along the line A—A) and 25 mm in cross-section normal to the line A—A.

Figure 7:
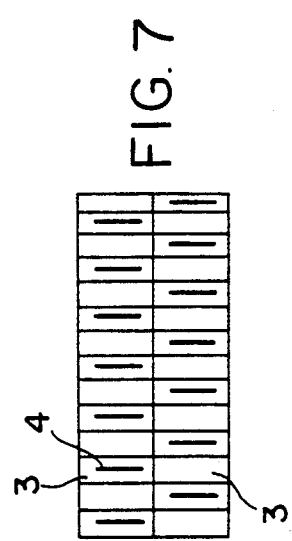
FIG. 7 is a plan view of a mould carrying several shell products, some of the filled type also shown in FIG. 2.

As already indicated, moulds from the conveyor belt each contain rows of, say, fourteen shell products which can be filled. Filling may be achieved by the simple expedient of depositing a continuous finger of, say, mont along some or all of axially-aligned half-tubular shells. FIG. 7 shows the preferred arrangement of filling 4, i.e. in alternate shells 3 in each row of fourteen troughs. Twenty-eight products of the invention can then very simply be formed by inverting one mould of an adjacent pair and superimposing the inverted mould on the non-inverted mould, then or later under conditions such that two mating shells are bonded together at their edges.

Figure 8:
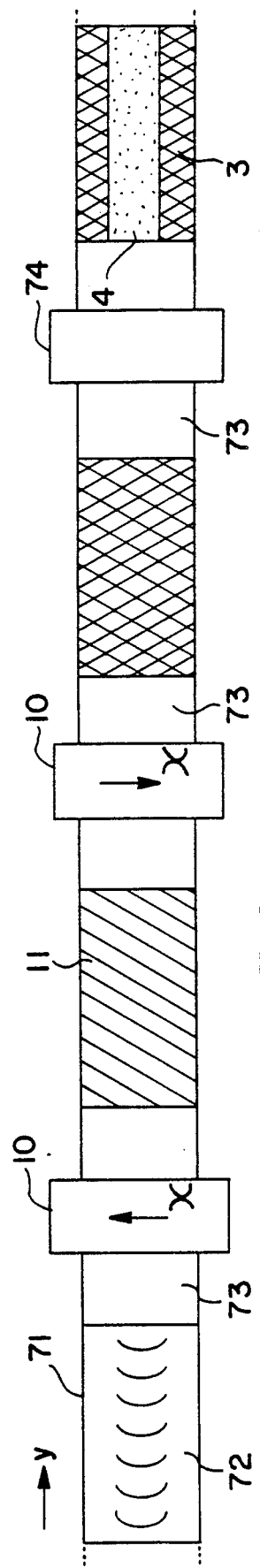
FIG. 8 is a schematic plan view of an alternative arrangement to that of FIG. 3, including apparatus embodying the invention, which can be used to build up a product of the type illustrated in FIG. 1.

FIG. 8 shows a continuous belt 71 of concave shell moulds 72 separated by areas 73. In use, the belt 71 passes in sequence beneath two depositor heads 10

(which dispense filaments 21) and a filling station 74 such as a valved manifold (which dispenses a filling 4). A cooling station (not shown) may be provided in or after the given sequence, especially when the filaments are of chocolate. The left-hand mould 72 is empty, and the drawing shows how a succession of moulds 72 is filled in sequence, as it moves in the direction of the arrow y.

The arrows x indicate the same speeds and different directions of the respective apertured bands 14 in contact with the extrudable material in each extrusion head 10. The speed ratio x/y determines the angle of the part helices formed by the filaments 21 in the moulds 72, and is preferably substantially more than 1. The consequent (small degree) of stretching of the filaments 21 across each mould 72 contributes to the strength of the product, especially if the filaments are of chocolate. The angle of each array of deposited filaments with respect to the direction of travel of the band 14 is preferably 5° to 25°, e.g. 10°. In general, however, the relatively slow speed of the band which is used in the apparatus described earlier is preferred, particularly when the extrudable material is sensitive, as is chocolate, to the effects of pressure and temperature.

FIG. 8 shows the production of a shells comprising two superimposed parallel arrays of deposited filaments. Larger-scale apparatus can be designed to work on exactly the same principle, including also means to bring together and bond two shells to form essentially tubular products (with or without filling). The external structure preferably comprises more than two superimposed arrays of filaments in a lattice structure. For example, two or preferably three superimposed arrays are produced, preferably with cooling after producing each layer of superimposed arrays.

FIG. 8 shows areas 72, i.e. moulds which are separated in the (axial) direction of travel. In order that the bands 14 in the extruder head 10 should operate continuously, the apertures 20 may be in groups synchronised with the passage of the moulds 72; the band 14 also includes non-apertured sections synchronised with the passage of areas 72.

Larger-scale apparatus will usually operate using a belt having a succession of several laterally-adjacent, axially-parallel moulds, so that the several moulds are filled simultaneously, e.g. as described with relation to FIG. 3. Especially where there are laterally or longitudinally adjacent moulds, and continuous filament deposition, filaments will extend over the divisions (ridges) between moulds. Means for scraping off or removing filaments outside the moulds may then be provided.

There is a great variety of methods by which the necessary relative motion of support with respect to extruded filament array, and superimposition of deposited arrays, can be achieved. The following are illustrative alternatives ("manifold" is used to imply either a head having fixed nozzles or deposition apparatus as described above, effectively a moving manifold):

(1) (as described above) unidirectional manifold motion and unidirectional support motion;
(2) (as described above and presently preferred) unidirectional manifold and oscillating support;
(3) oscillating manifold and stationary support;
(4) oscillating manifold and oscillating support;
(5) swinging manifold and unidirectional support;
(6) stationary manifold and unidirectional support;
(7) oscillating manifold and unidirectional support;
(8) axial roll-up;
(9) transverse roll-up;
(10) inside-out forming;
(11) outside-in forming.

Under the general heading of these various procedures, various broad concepts for formation of a product of the invention may be considered For example, a filling or mont is extruded and chocolate filaments are extruded and wound helically around the filling; filaments are deposited on to a flat, flexible surface, which is then rolled up axially; filaments are deposited across a series of small diameter bars which are then moved together to produce a product having an oval cross-section; a tubular product is made, by "inside-out forming" in the same sense that a silk worm winds a cocoon; a tubular product is formed as a continuous "vertical sausage" which is allowed to precess around a rotating vertical axis spinning cone which acts as a buffer region; filaments are laid on a trough conveyor which is rolled up transversely to the axis of the filaments; filaments are deposited from a single head on to belts moving in opposite directions, such that strands lying across the interface between opposite moving belts tear (so that there is no need for cutting between individual products); filaments are deposited from a single head on to converging belts which then diverge, such that filaments lying across the belt interface are stretched to failure.

It is generally preferred that the support should oscillate or move unidirectionally. Since it is also usually relatively simple to have a stationary head, apparatus which provides a moving array of filaments is particularly suitable for use in the invention. As illustrated above, that array may move in one direction only, although the direction of the band could be reversed, to provide the same effect as an oscillating manifold.

Whether the support is corrugated or flat, it will often be preferred to deposit short areas of filaments in the support's direction of travel, rather than continuous filaments which may have to be cleaned or scraped off the support between individual products. Extrusion rate, support rate, etc. may be controlled accordingly.

We claim:

1. An apparatus for forming an array of filaments comprising:
   (a) an extrusion head having a longitudinal opening for extruding a material;
   (b) a longitudinal body having an array of a plurality of apertures aligned in the same longitudinal plane with the longitudinal extrusion head opening for forming an array of filaments of material extruded through the opening and the apertures;
   (c) means for moving the apertured body continuously beneath the extrusion head opening, in a direction of the aligned longitudinal extrusion head, such that, in operation, a plurality of apertures are simultaneously positioned underneath the extrusion head opening and in contact with the extruded material and an array of filaments is continuously formed; and
   (d) a support positioned for receiving the formed array of extruded filaments.

2. An apparatus according to claim 1 wherein the array of apertures comprises a line of apertures.

3. An apparatus according to claim 1 or 2 further comprising means for providing relative motion of the support with respect to the apertured body.

4. An apparatus according to claim 1 or 2 further comprising means for moving the support relative to the apertured body.

5. An apparatus according to claim 4 wherein the means for moving the support comprises means for reciprocally moving the support beneath the apertured body.

6. An apparatus according to claim 5 wherein the support comprises a plurality of elongated half-shell molds of semi-circular cross section for forming elongated half-shells of deposited arrays of filament.

7. An apparatus according to claim 6 further comprising means for joining two half-shells of deposited arrays of filaments to form a tubular product.

8. An apparatus according to claim 7 further comprising means for introducing a filling into at least one half-shell before the half-shells are joined.

9. An apparatus according to claim 1 comprising two spaced extruder heads and two apertured bodies, wherein each apertured body is positioned under an extruder head, wherein, in operation, the apertured bodies move in opposed directions, and wherein, in operation, the support moves unidirectionally beneath the apertured bodies and receives two arrays of superimposed filaments.

10. An apparatus according to claim 1 wherein the extrusion head comprises an upper plenum chamber and a lower plenum chamber connected by a plurality of channels having disposed therein adjustable means for controlling flow of material from the upper plenum chamber to the lower plenum chamber.

11. An apparatus according to claim 10 wherein the extrusion head further comprises longitudinally extending lip seals positioned on either side of the opening.

* * * * *

UNITED STATES PATENT AND TRADEMARK OFFICE
CERTIFICATE OF CORRECTION

PATENT NO. : 5,129,315

DATED : July 14, 1992

INVENTOR(S) : Malcolm C. BURWELL, et al.

It is certified that error appears in the above-identified patent and that said Letters Patent is hereby corrected as shown below:

On the title page, under the heading "References Cited U.S. PATENT DOCUMENTS" (item [56]), the following references also should be listed:

```
2,648,297  8/1953  Cloud
3,776,185  12/1973 Kawasaki
4,357,559  11/1982 Cloud, et al.
```

Under the heading "FOREIGN PATENT DOCUMENTS", the following references also should be listed:

```
 646342  11/1984 Switzerland
1604585  12/1981 Great Britain
1604586  12/1981 Great Britain
2186836B 11/1989 Great Britain
```

Column 8, line 55 (line 13 of claim 1), after "head" insert --opening--.

Signed and Sealed this

Fourteenth Day of September, 1993

Attest:

BRUCE LEHMAN

Attesting Officer

Commissioner of Patents and Trademarks